(12) United States Patent
Levionnais et al.

(10) Patent No.: US 11,509,402 B2
(45) Date of Patent: Nov. 22, 2022

(54) METHOD AND SYSTEM FOR RECOGNIZING A USER DURING A RADIO COMMUNICATION VIA THE HUMAN BODY

(71) Applicant: ORANGE, Issy-les-Moulineaux (FR)

(72) Inventors: Philippe Levionnais, Chatillon (FR); Olivier Lepetit, Chatillon (FR); Romain Huet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/651,206

(22) PCT Filed: Sep. 11, 2018

(86) PCT No.: PCT/FR2018/052216
§ 371 (c)(1),
(2) Date: Mar. 26, 2020

(87) PCT Pub. No.: WO2019/063902
PCT Pub. Date: Apr. 4, 2019

(65) Prior Publication Data
US 2020/0295847 A1    Sep. 17, 2020

(30) Foreign Application Priority Data
Sep. 29, 2017 (FR) ........................... 1759103

(51) Int. Cl.
*H04B 13/00* (2006.01)
*H04W 24/08* (2009.01)

(52) U.S. Cl.
CPC .......... *H04B 13/005* (2013.01); *H04W 24/08* (2013.01)

(58) Field of Classification Search
CPC .............................. H04B 13/005; H04W 24/08
See application file for complete search history.

(56) References Cited

U.S. PATENT DOCUMENTS

2004/0235450 A1* 11/2004 Rosenberg ........... G06Q 20/327
                                                         455/406
2005/0001024 A1*  1/2005 Kusaka .............. H04N 1/00153
                                                         235/375
(Continued)

FOREIGN PATENT DOCUMENTS

WO    2012131224 A1   10/2012
WO    2013136119 A1    9/2013
(Continued)

OTHER PUBLICATIONS

Qifan Pu et al: "Whole-home gesture recognition using wireless signals", Proceedings of the 19th Annual International Conference on Mobile Computing & Networking, MOBICOM '13, Jan. 1, 2013 (Jan. 1, 2013), p. 27, XP055233874.
(Continued)

*Primary Examiner* — Brenda H Pham
(74) *Attorney, Agent, or Firm* — David D. Brush; Westman, Champlin & Koehler, P.A.

(57) ABSTRACT

A method for recognizing a user carrying a terminal capable of receiving a radio signal coming from a device equipped with an antenna suitable for transmitting the signal. The signal is intended to be transmitted between the device and the terminal by using electromagnetic wave conduction capacities of the body of the user when at least one part of his/her body is in the vicinity of the antenna. When the user makes a characteristic movement, to move the part of his/her body close to the antenna, the device transmits a characteristic signal of the movement. The method includes: receiving a signal coming from the device; generating a characteristic datum of the movement; obtaining at least one signature; comparing the characteristic datum with the signature; and depending on the results of the comparison, recognizing the user.

12 Claims, 3 Drawing Sheets

(56) References Cited

U.S. PATENT DOCUMENTS

2014/0313154 A1* 10/2014 Bengtsson ........... H04B 13/005
 345/174
2018/0351604 A1 12/2018 Levionnais et al.

FOREIGN PATENT DOCUMENTS

WO 2016001506 A1 1/2016
WO 2017093639 A1 6/2017

OTHER PUBLICATIONS

English translation of Written Opinion of the International Searching Authority dated Nov. 16, 2018 for corresponding International Application No. PCT/FR2018/052216, filed Sep. 11, 2018.
Xu, Ruoyu et al., "Electric-Field Intrabody Communication Channel Modeling With Finite-Element Method", IEEE Transactions on Biomedical Engineering, vol. 58, No. 3, Mar. 2011, 8 pages.
Mebarka, M.Belahcene-Benatia, "Facial authentication and identification based on wavelets and neural networks", Article from Revue science des matériaux (Journal ofmaterial science), Laboratoire Larhyss, Sep. 2014, 26 pages, with translation.
Khorshid, Ahmed E., et al., "Intra-Body Communication Model Based on Variable Biological Parameters", Electrical Engineering and Computer Science University of California, IEEE, dated 2015, 4 pages.
Wang, Wen-cheng et al., "Experimental Studies on Human Body Communication Characteristics based upon Capacitive Coupling", Institute of Biomedical and Health Engineering, Shenzhen Institutes of Advanced Technology, Chinese Academy of Sciences, DOI: 10.1109/BSN.2011.9, dated 2011, 6 pages.
English translation of the French Written Opinion of French Application No. 1759103.
International Search Report dated Nov. 7, 2018 for corresponding International Application No. PCT/FR2018/052216, filed Sep. 11, 2018.
Written Opinion of the International Searching Authority dated Nov. 7, 2018 for corresponding International Application No. PCT/FR2018/052216, filed Sep. 11, 2018.

* cited by examiner

METHOD AND SYSTEM FOR RECOGNIZING A USER DURING A RADIO COMMUNICATION VIA THE HUMAN BODY

CROSS-REFERENCE TO RELATED APPLICATIONS

This Application is a Section 371 National Stage Application of International Application No. PCT/FR2018/052216, filed Sep. 11, 2018, the content of which is incorporated herein by reference in its entirety, and published as WO 2019/063902 on Apr. 4, 2019, not in English.

FIELD OF THE DISCLOSURE

The invention relates to communications initiated on a short-range wireless channel. More precisely, the invention pertains to a method for implementing secure services between a handheld terminal and a device able to initiate a communication using the human body's conductivity capacity in order to transmit the carrier electromagnetic waves of such wireless communications.

PRIOR ART

Over the past decades, new wireless communication techniques using the human body as channel have appeared. In these technologies, grouped together under the generic term IBC (from the English: Intra-Body Communication) or else BCC (for Body Channel Communication), the human body acts as a conductor to transmit information from one point to another. Of more particular concern here are schemes based on coupling by induction, also frequently called "near field schemes" or NF (from the English Near Field), adapted to proximity communication. Near-field communications are usually known by the initials "NFC" (for "Near Field Communication"), based mainly on ISO (International Standard Organization) standard 14443, use wireless technologies to allow an exchange of information between two peripherals a short distance apart.

Systems are known in the prior art which make it possible to exchange messages by using the human body's conductivity capacity in order to transmit the carrier electromagnetic waves of wireless communications. The applicant's international patent application published under the number WO2017/093639 describes in particular a communication system comprising a handheld, or mobile, emitter device whose antenna is in contact with, or very close, to the user, called the "carrier" here. By "close" is meant a distance of the order of a few millimeters to a few centimeters. This system according to the prior art also comprises a so-called master device, or base station, which comprises a surface consisting of an antenna which the user can approach with their hand to establish a communication. This type of system offers the user the advantage of being able to keep the terminal in their pocket throughout the duration of the processing, therefore of having their hands free, without fear of being robbed or of dropping the terminal, or of losing time searching for it in a bag, etc. Hereinafter, this system will be called "CBB" (for Communication By Body) so as to distinguish it from the other systems which require direct contact with the user's body.

Today, however, CBB communication is not secure. The carrier themself may validate a transaction in error: if they approach the device sufficiently closely, the wave may be received although the user has not voluntarily approached it with their hand. Neither does this type of system ensure the identification of the carrier of the mobile item. Indeed, in the system described hereinabove, it may be imagined that a second user, for example malicious, uses the transaction to their own advantage: they may steal the user's terminal, or else shove them just as they are approaching the console in order to pass through the door in place of the carrier, validate a purchase, etc.

To secure such access, it is possible to require furthermore that the user should input a confidential code. However, this scheme is tedious and presents a risk of theft of the confidential code.

It has also been proposed, in the applicant's application WO2016/001506, that a voluntary gesture of the user be detected and validated, so as to be sure that the approach gesture is actually performed. However, this solution, though it avoids a fortuitous drawing closer of the receiver device, still exhibits drawbacks, since anyone who has appropriated the mobile item or is in proximity to the mobile item may perform such a gesture, that is to say that the user may be neither recognized, nor identified, nor authenticated.

The invention offers a solution not exhibiting the drawbacks of the prior art.

SUMMARY

To this effect, according to a functional aspect, the invention relates to a method for recognizing a user carrying a terminal, said terminal being able to receive a radio signal originating from a master device furnished with an antenna able to emit the signal, said signal being intended to be transmitted between the master device and the terminal on a first channel using electromagnetic wave conduction capacities of the body of the user when at least a part of said body of the user such as their hand is situated in proximity to the antenna, characterized in that:

when the user performs a movement, so-called characteristic movement, so as to approach the antenna of the device with said part of their body, said master device transmits a signal characteristic of said movement;

and the method comprises the steps of:
reception on the terminal of a signal originating from the master device;
generation of a first datum characteristic of the movement as a function of the received signal;
obtaining of at least one second characteristic datum, so-called reference signature;
comparison of the first characteristic datum with said at least one reference signature;
as a function of the results of the comparison, recognition of the user.

According to the invention, a radio carrier wave, or electromagnetic signal, is transmitted through the body of a user from the emitter device, so-called master, to a receiver device, so-called terminal. The user can be recognized and thereafter identified or authenticated by performing a characteristic voluntary movement in the direction of the master device, while keeping the portable terminal, for example their smartphone, in their pocket. By voluntary movement of the user is meant any movement performed consciously by the latter with the aim of having themself recognized, typically a hand or arm movement known to themself alone. Such a movement generates a signal of specific characteristics at the level of the terminal: the master device emits an electromagnetic signal permanently but the latter is transmitted only when the user approaches the antenna of the device. The transmission of the signal is interrupted when the user moves away from the antenna, and resumes when the user approaches it again; the amplitude of the signal increases or decreases according to the distance between their hand and the antenna. The shape of the signal generated and transmitted via the user's body therefore depends on the movement, but also on a certain number of characteristics specific to the carrier (build, age, sex, tissue moisture, etc.), as well as reception means of the terminal (characteristics and position of the antenna, etc.). The analysis of such a signal (shape, power, etc.) therefore makes it possible to glean therefrom characteristics specific to the user and/or to their movement and/or to their terminal, therefore to recognize same by comparison with a known similar signal (a signature). If another user appropriates the terminal, on the one hand they do not have the same biometric characteristics, on the other hand they do not have any reason to know the user's voluntary movement. They will therefore not be able to be recognized.

By "recognition" is meant here the recognition of the user in the broad sense. It may entail an authentication, that is to say a verification of the legitimacy of the user of the terminal (or recognition of the fact that the user is indeed the owner of the telephone), or an identification of the user, that is to say the establishment of the identity of the user (it is Jacques and not Paul); identification may naturally be followed by an authentication (it is legitimate for Jacques to use the terminal).

By "proximity" is meant a sufficiently small distance in order for the communication to be established on the CBB channel (for example less than a few cm, this being reasonable in order for the user to carry the terminal in a pocket). It will be noted that the user's skin does not need to be in contact with the terminal in order for the communication to be established; neither is the user's hand necessarily in physical contact with the antenna of the device.

According to a particular mode of implementation, such a method is characterized in that said at least one reference signature is associated with a profile of a user and in that the recognition step is followed by a step of selecting the profile of the recognized user.

Advantageously according to this mode, a service will be able to be personalized, that is to say adapted to the user who has just been recognized. For example, in the context of a domestic network, the objects of this network may act differently according to the person that requests a service (one of the members of the household) from the master device (a reading console on the domestic gateway, the television, etc.). Association of a profile with each user of the household allows simple selection of the right profile once the user of the terminal has been recognized, and makes it possible thereafter to personalize the services rendered by the objects of the local network.

According to another particular mode of implementation, which will be able to be implemented alternatively or cumulatively with that above, such a method is characterized in that the recognition step is followed by a step of establishing a radio communication on a second channel not using electromagnetic wave conduction capacities of the body of the user.

Advantageously according to this mode, the user having been recognized, a radio channel, for example Bluetooth or Wi-Fi, distinct from the body, is opened between the two appliances. This channel, of higher capacity than the first channel, and moreover bidirectional, will be able to be used advantageously to transport the data which is useful to the service required (monetary data, transport tickets, etc.)

According to another particular mode of implementation, which will be able to be implemented alternatively or cumulatively with those above, such a method is characterized in that the step of establishing a first datum characteristic of the movement comprises a sub-step of detecting a porch at least corresponding to a voluntary gesture of the user.

By porch, or slot, is meant a portion of the signal comprising a rising edge, a falling edge and a plateau between the two, which is generated by a voluntary gesture of approach of the user. By voluntary gesture is therefore meant a part of a more complex movement of the user. For example, the movement specific to the user may consist of three taps according to a chosen temporal sequence. Each of the taps corresponds to a voluntary gesture and generates a characteristic porch in the signal. According to one embodiment of the invention, the signal is submitted for subsequent analysis only if at least one of the taps is present. It is indeed unnecessary to process the signal and proceed to identification if it corresponds to a fortuitous movement of the user. A voluntary gesture can therefore be searched for in the signal before analyzing it completely. This makes it possible in particular to avoid overloading the equipment charged with the analysis (e.g. the mobile terminal) since only voluntary gestures will be able to be submitted for subsequent recognition. On the other hand, if at least one of the porches is present, it is beneficial to continue the analysis and to detect the following porches so as to determine a characteristic curve which can be contrasted with the user's signature.

According to another particular mode of implementation, which will be able to be implemented alternatively or cumulatively with those above, such a method is characterized in that the step of generating a first datum characteristic of the movement comprises the following sub-steps:
  digitization of the received signal;
  detection in the digital signal of at least one rising edge and one falling edge corresponding to at least one porch;
  generation of the first characteristic datum in the form of a digital signal comprising at least said porch.

Advantageously according to this mode, the first characteristic datum, representative of the movement, is generated in a simple form corresponding to a signal comprising as many porches as voluntary gestures that the user has performed. Each elementary voluntary gesture (tap, fast approach followed by a retreat, scan, etc.) is indeed manifested by a characteristic porch in the signal obtained. Such a signal curve can be easily contrasted and compared with a reference signature of the user, established according to the same criteria.

According to another particular mode of implementation, which will be able to be implemented alternatively or cumulatively with those above, such a method is characterized in that the comparison step comprises the following sub-steps, after compensation of a possible shift between the characteristic datum and the reference signature:
  measurement of a distance between the first characteristic datum and the reference signature;
  validation of the comparison as a function of the measured distance.

This embodiment of the invention allows a simple implementation of a step of comparing between the characteristic datum obtained subsequent to the user's voluntary movement and the reference signature. Any type of distance calculation within the scope of the person skilled in the art will be able to be used. This distance can be conventionally compared with a predetermined threshold, or maximum acceptable distance between the two signals. As the two signals are not necessarily temporally aligned since it is not possible to control the moment at which the user initiates their movement, it is desirable to use beforehand a processing algorithm capable of taking into account and of compensating a possible shift between the signals.

According to another functional aspect, the invention relates to a method of learning a reference signature of a user carrying a terminal, said terminal being able to receive a radio signal originating from a master device furnished with an antenna able to emit the signal, said signal being intended to be transmitted between the master device and the terminal by using electromagnetic wave conduction capacities of the body of the user when at least a part of the body of the user such as their hand is situated in proximity to the antenna, the method being characterized in that:

when the user performs a movement, so-called characteristic movement, so as to approach the antenna of the device with said part of their body, said master device transmits a signal characteristic of said movement;

and the method comprises the steps of:

reception of a plurality of signals originating from the master device;

generation of a characteristic datum, so-called reference signature, as a function of the plurality of received signals;

recording of said signature in the guise of reference signature of the user.

Advantageously, the invention according to this functional aspect makes it possible to record a signature of the user, for subsequent identification and/or authentication, by requesting them to perform a characteristic voluntary movement in the direction of the master device several times, while keeping the portable terminal, for example their smartphone, in their pocket. The learning device is typically situated on the user's terminal but could be situated at some other location, in the network or on the master device. The user performs a natural movement or chooses to this effect a particular movement which is specific to themselves, and repeats it as many times as necessary while approaching the master device (which may for example be situated in an outlet of the telecommunications operator to which the terminal is attached, or at the user's home, etc.). As was explained earlier, the shape of the signal generated and transmitted via the user's body depends on the movement, as well as on a certain number of characteristics specific to the carrier (build, age, sex, tissue moisture, etc.) and to the terminal. By exploiting several such signals, a characteristic signal (average of the input signals, signal minimizing the standard deviation of the distribution of the input signals, etc.) can be calculated, corresponding to a reliable signature of the user. It will be noted that the more signals which are obtained that are close to one another the more representative this signature is of the movement particular to the user.

According to a variant of this particular mode of implementation, such a method of learning is characterized in that it furthermore comprises a step of obtaining the necessary number of signals of said plurality of signals.

Advantageously according to this mode, the number of signals to be generated for the method of learning, and therefore of voluntary movements to be performed by the user toward the learning console, is parametrizable. It may for example be chosen statistically so as to be able to calculate a sufficiently reliable signature of the user. This number may for example be predefined in the factory (it may be decided that 5 characteristic signals suffice to calculate a correct signature), predefined by the user, calculated by the method, etc.

According to another variant of this particular mode of implementation, which will be able to be implemented alternatively or cumulatively with that above, such a method of learning is characterized in that the step of obtaining the necessary number of signals comprises the following sub-steps:

obtaining of a plurality of characteristic signals;

calculation of a distance between said signals of the plurality of signals;

as a function of the calculated distance, obtaining of a new characteristic signal to be added to the plurality of characteristic signals.

Advantageously according to this variant, the number of signals to be generated, and therefore of voluntary movements to be performed by the user toward the learning console, is calculated by the method of learning itself, as a function of the reliability and/or of the resemblance between the various signals generated by the movement of the user. For example, the algorithm may decide that three mutually "close" (in the sense of a distance measurement) signals suffice to establish a signature. If on the other hand the first three signals obtained are very "different" from one another, in the sense of a distance measurement, then additional signals should be acquired so as to be able to calculate a correct signature on the basis of the distribution of the signals. Any distance measurement within the scope of the person skilled in the art can be used (Euclidean distance, correlation function, etc.). This distance can be conventionally compared at each step with a predetermined threshold, or maximum acceptable distance, and according to the results of the comparison, a new characteristic signal is or is not added to the plurality of signals.

According to a hardware aspect, the invention also relates to a device for verifying a signature, characterized in that it comprises the following modules:

a module for receiving a first datum characteristic of a movement;

a module for obtaining at least one second characteristic datum, so-called signature;

a module for comparing the first characteristic datum with said at least one signature;

a communication module for communicating the results of the comparison.

According to a hardware aspect, the invention also relates to a terminal carried by a user, said terminal being able to receive a radio signal originating from a master device furnished with an antenna able to emit the signal, said signal being intended to be transmitted between the master device and the terminal by using electromagnetic wave conduction capacities of the body of the user when at least a part of the body of the user such as their hand is situated in proximity to the antenna, characterized in that said terminal comprises the following modules:

a module for receiving a signal originating from the master device;

a module for generating a first datum characteristic of the movement as a function of the received signal;

a module for obtaining a comparison result of comparing the first characteristic datum with at least one reference signature;

a module for recognizing the user, as a function of the result of the comparison.

According to another hardware aspect, the invention also relates to a system for recognizing a user comprising:

a device, so-called master device, furnished with an antenna able to emit a signal intended to be transmitted between the master device and at least one terminal by using electromagnetic wave conduction capacities of the body of the user when at least a part of the body of the user such as their hand is situated in proximity to the antenna, at least one terminal of a the user such as previously described, comprising a device for verifying a signature, such as previously described, characterized in that, when the user performs a movement, so-called characteristic movement, so as to approach the antenna of the master device with said part of their body, said device transmits a signal characteristic of said movement, received by the receiving module of the terminal of the user.

According to another hardware aspect, the invention also relates to a device for learning a reference signature of a user carrying a terminal, said terminal being able to receive a radio signal originating from a master device furnished with an antenna able to emit the signal, said signal being intended to be transmitted between the master device and the terminal by using electromagnetic wave conduction capacities of the body of the user when at least a part of the body of the user such as their hand is situated in proximity to the antenna, characterized in that:

when the user performs a movement, so-called characteristic movement, so as to approach the antenna of the device with said part of their body, said master device transmits a signal characteristic of said movement;

and the learning device comprises the following modules:
a module for receiving a plurality of signals originating from the master device;
a module for generating a characteristic datum, so-called signature, as a function of the plurality of received signals;
a module for recording said signature in the guise of reference signature of the user.

According to another hardware aspect, the invention also relates to a terminal comprising a device for learning a signature, such as described hereinabove.

According to another hardware aspect, the invention also relates to a computer program able to be implemented in a terminal such as defined hereinabove, the program comprising code instructions which, when the program is executed by a processor, performs the steps of the method of recognition and/or of learning.

According to another hardware aspect, the invention also relates to a computer program able to be implemented in a master device such as defined hereinabove, the program comprising code instructions which, when the program is executed by a processor, performs the steps of the method of recognition and/or of learning.

These programs can use any programming language, and be in the form of source code, object code, or of code intermediate between source code and object code, such as in a partially compiled form, or in any other desirable form.

According to yet another hardware aspect, the invention deals with a recording medium readable by a data processor on which is recorded a program comprising program code instructions for the execution of the steps of one of the methods defined hereinabove. The information medium can be any entity or device capable of storing the program. For example, the medium can comprise a storage means, such as a ROM, for example a CD ROM or a microelectronic circuit ROM, or else a magnetic recording means, for example a diskette (floppy disc) or a hard disk. Moreover, the information medium can be a transmissible medium such as an electrical or optical signal, which can be conveyed via an electrical or optical cable, by radio or by other means. The program according to the invention can in particular be downloaded over a network of Internet type. Alternatively, the information medium can be an integrated circuit in which the program is incorporated, the circuit being adapted to execute or to be used in the execution of the method in question.

Numerous details and advantages of the invention will be better understood on reading the description of a particular embodiment with reference to the appended diagrams given without limitation and in which:

DETAILED DESCRIPTION OF ILLUSTRATIVE EMBODIMENTS

Figure 1:
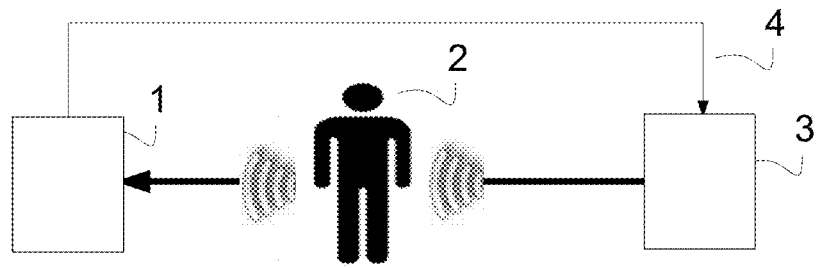
FIG. 1 represents a communication system according to one embodiment of the invention when the user of a handheld terminal performs a transaction with a master device.

FIG. 1 represents a system for wireless communication according to one embodiment of the invention when a user (2) carrying a handheld device (1), hereinafter called terminal, equipped with a CBB module such as defined earlier, approaches and almost touches the master device (3) by a voluntary movement, in order to implement a service.

By service is meant any type of service, for example a monetary transaction, a ticket validation, the personalization of an environment, etc.

The user (2) or carrier of the terminal (1) is for example a human being but could alternatively take the form of some other living being able to perform the voluntary gesture and to transmit radio carrier waves.

The master device (3) may for example be a connected object (in English, IOT), an EPT (for Electronic Payment Terminal), a personal computer, a computer mouse, a domestic gateway, etc. It is able to emit radioelectric signals of NFC type, through the body of the user, via an NFC/CBB antenna (not represented). In this exemplary embodiment, the master device (3) comprises a surface consisting of the antenna optionally protected and adapted to react when the user swipes it or comes into proximity with it, for example by approaching it with their hand. The term "surface" is in no way limiting and given by way of illustration, the antenna being the only means indispensable to the operation of the device. The assembly consisting of the antenna, of the surface and more generally of all the hardware components necessary for the implementation of an IBC communication is called "Master IBC Module" hereinafter, denoted MIBCM. It will be noted that this module corresponds to the standard NFC module of an NFC-type console parametrized for a CBB communication by loading a specific program (software), without modification of the hardware. The master device according to this example (3) is an EPT comprising for example a user interface (9), also called MMI, intended to display messages for the attention of the user and optionally to receive data.

The terminal (1) according to the invention is a handheld device naturally able to receive radio carrier waves, via an antenna, through the body of the user (2). To this end, the terminal (1) is situated in immediate proximity to the user (2), without necessarily being in direct contact with the latter. For example, the terminal (1) is placed inside a pocket or a bag carried against the user. In these configurations, it is estimated that the terminal (1) is no more than a few centimeters away from the body of the user (2). The distance is for example less than 5 cm. The terminal (1) is equipped with a battery or with cells, for autonomous operation. According to this example it is a mobile terminal equipped with an NFC antenna (not represented) adapted in CBB mode to receive the electrical signals modulated in the form of an electromagnetic wave through the body of the user when the latter is in immediate proximity to the master device. According to a preferred embodiment, the terminal comprises moreover means for communicating on a second channel (4), for example Bluetooth or Wi-Fi, with the master device. Such a terminal is described in the patent application published under the number WO2017/093639. According to another embodiment, the terminal could also be capable of emitting data toward the master device by using a BCC channel. Such a terminal is described in the patent application published under the number WO2012/131224. However, hereinafter a return channel of Bluetooth type will be used since such a channel advantageously makes it possible to avoid the use of powers that are overly high and therefore harmful to the human body, and which would be necessary in order to obtain utilizable signals on the master devices when reading. Moreover, the use of a Bluetooth channel (4) allows higher bitrates and transmission speeds than CBB. This also allows the master device to communicate not only with the user's terminal but even with another terminal (e.g. a garage door for opening purposes, a connected television, etc.) in order to perform the transaction.

According to a first scenario, the user (2) is for example in a shop and wishes to settle a purchase with the aid of a digital ("dematerialized") bank card situated on their terminal. The master device is able to establish with the mobile terminal a secure communication with the aim of validating the monetary transaction; the user must be authenticated, that is to say that on completion of the method it is certain that this is indeed the owner of the terminal.

According to another scenario, the user (2) is at their home and the master device is a connected object, placed for example on a refrigerator, a TV, etc. The connected object performs appropriate actions according to the person who has just approached it (filling, locking, display, etc.); the user must be identified that is to say that on completion of the method it is possible to discriminate them from among several people.

In both cases, the method according to the invention proceeds in two distinct stages, or phases:

First Phase: Learning of the Characteristic Imprint or Signature

In a first stage, which corresponds to a so-called learning phase, the user performs several times (hereinafter, N times, where N is a natural integer) a voluntary movement of approach to the reader associated with the learning module. It will be noted that for this step, the user is not necessarily in the shop. The aim of this step is to recover, preferably on the terminal (or alternatively, on some other device with which the terminal is able to exchange data) a plurality (N) of signals which correspond to the signals generated by the person (2) when the latter places their hand on the reader as many times (N). These signals correspond to the characteristics of the user and of their gesture, but with small variations, since the user may not always perform exactly the same gesture with the same mechanical/dynamic parameters and their physiological parameters may moreover vary over time, giving rise to a variation in the signal propagated through the body. Moreover the terminal also intervenes on the shape of the received signal. Nonetheless for a given person performing a characteristic voluntary movement with a given terminal, all the signals are of very similar overall shape and represent a sort of biometric and behavioral imprint of the user, which hereinafter will be called "characteristic imprint" or "signature" of the user. The characteristic imprint is therefore representative:

- of the behavior, or else of the voluntary movement performed by the user (MV); for example the user can approach the reader with their hand by performing a lateral, circular, movement with circumvolutions, place down their hand or some of their fingers several times, perform taps, etc. They may moreover play with accelerations, decelerations, etc. Thus, each user can have their own movement, preferably secret, hereinafter called "voluntary movement of the user" corresponding to their characteristic imprint or signature.
- of their intrinsic characteristics; in addition to the behavioral biometric parameters which condition the transmission of the signal, certain biological factors, such as for example the age, the physical condition, the motor control, the tissue moisture of the body etc. of the user can influence their transmission characteristics. It will be possible for example to refer to the article "Intra-Body Communication Model Based on Variable Biological Parameters" (Khorshid et al., 2015, 49th Asilomar Conference on Signals, Systems and Computers).
- of the characteristics of the terminal itself, and in particular of its CBB reception circuit (characteristics and orientation of the antenna, proximity of the user's body, etc.).

The characteristic imprint (SIG), based at one and the same time on elements intrinsic to the person and on their behavior, can be obtained through the N slightly different measurements entrusted to a learning module charged with calculating an "average value", of the various signals, or standard signal corresponding to the characteristic imprint. This module is typically an automatic learning module, in English "machine learning" (ML). It is recalled that automatic learning, or statistical learning, relates to the design, analysis, development and implementation of schemes allowing a machine (in the broad sense) to evolve through a systematic process, and thus to fulfill difficult or problematic tasks through more conventional algorithmic means. A possible example of automatic learning is that of classification the aim of which is to label each datum by associating it with a class. It is also possible to envisage the use of neural networks, etc.

According to this embodiment, the learning module calculates a characteristic imprint on the basis of the various signals of a user (for example it averages all the valid trials, a set of parameters characteristic of the imprint, etc.). Next it records in a database the imprints of users optionally tagged by their identifiers. Once the learning has been performed, the resulting characteristic imprint can advantageously be recorded on the user's terminal. If the terminal is used by several users, several characteristic imprints can be recorded, for example in conjunction with an identifier of each user if it is beneficial to discriminate them.

Second Phase: Utilization of the Characteristic Imprint

In a second phase (of implementation of the service), the user of the IBC mobile terminal that wishes to validate a transaction approaches the master device (3, for example a console) and directs their hand above the antenna, while replaying their characteristic voluntary movement. When the communication channel is established, the signal propagates from the console (3) to the mobile item (1) of the user, through their body.

A module for verification of the terminal or linked with the terminal (for example on an external server) verifies the user's characteristic imprint. It is capable, typically, of comparing the standard signal curve corresponding to the voluntary movement with a signal curve corresponding to the user's characteristic imprint, or signature, which has previously been recorded on the terminal or in a database accessible from the terminal.

If their characteristic imprint is recognized, the user is identified or authenticated and the two devices can exchange all the data necessary for establishing, continuing and concluding the service (establishment of a Bluetooth or Wi-Fl channel (4) to exchange data between the terminal and the device, cash debit, ticket, personalization of equipment, etc.). It will be noted that, during this second validation phase, the user could have removed their hand from the reader and gone away. As soon as the voluntary movement has been detected, they can, according to a variant, be informed thereof for example via a sound signal, so that they can remove their hand from the master device (3).

It is recalled that the antenna integrated with the smartphone is carried by the user. The invention therefore presents an essential advantage of ergonomics and security in the sense that it enables the person wishing to access a secure service to be identified and/or authenticated via their characteristic imprint without having to take their smartphone out of their pocket or their bag, and without re-entering any confidential code that could be purloined. The user appropriates the use of the terminal by deciding whether or not to trigger an action through their voluntary movement.

This exemplary embodiment has been given by way of wholly nonlimiting illustration. Numerous variants could be introduced thereto. In particular:
  another device, for example an external server, can perform the learning and/or the recognition on receipt of the data originating from the terminal.
  it is possible to imagine modeling the human body as a characterizable transmission channel, that is to say that it can be associated for example with a transfer function, well known to a person skilled in the art specializing in signal processing. In this case, the characteristics of the transfer function can advantageously replace the aforementioned curves. An example of such modeling is proposed for example in the article "Intra-Body Communication Model Based on Variable Biological Parameters" by Khorshid et al. cited above.

A terminal device (1) according to the invention will now be described in conjunction with FIG. 2. The terminal (1) is for example a mobile terminal of smartphone type adapted to implement the invention. According to another example, the terminal is a simple electronic card equipped with the following modules:

a processing unit, or "CPU" (for "Central Processing Unit"), intended to load instructions into memory, to execute them, to perform operations;
  a set M of memories, which includes a volatile memory, or "RAM" (for "Random Access Memory") used to execute code instructions, store variables, etc. and a nonvolatile memory of "ROM" (from the English "Read Only Memory"), or "EEPROM" (for "Electronically Erasable Programmable Read Only Memory") type intended to contain persistent information, in particular the user's identification data. According to one embodiment of the invention, the memory M contains a memory area (5), preferably secure, containing the characteristic imprint of a user of the terminal at least.
  a module termed "user IBC Module", MIBCU, including:
    a CBB antenna (ANT) adapted to receive signals on the radio pathway and via the human body, in such a way that a modulated electrical signal transported by the body of the user is able to be received by the antenna, which is situated in the terminal, in proximity with the human body;
    a demodulator (DEMOD), intended to receive via the antenna a modulated electrical signal and to transform it into a digital signal intended to be transmitted to the processing unit;
    the software components (firmware, etc.) necessary for the implementation of the CBB communications
    a radio module of Bluetooth or WiFi type intended to transmit in particular data in return from the mobile item to a master device.
  preferably, and in particular if these modules are not implemented on another device:
  a voluntary gesture detection module, DGV for analyzing the signals received by the CBB module and deciding whether or not this is a signal corresponding to a movement comprising a voluntary gesture (GV) of the user.
  a recognition module RECO for analyzing the signal received subsequent to a voluntary movement of the user, establishing a characteristic signal on the basis of the analog signal received, and establishing a comparison with a reference signature.
  an application-related module APPV for validating or otherwise the identity of the user as a function of the results of the comparison and for launching the relevant service.
  preferably, and in particular if this modules is not implemented on another device, an application (APPA) intended for the implementation of a method of learning according to embodiments of the invention, in particular:
  learning of the characteristic imprints;
  access to a database of characteristic imprints (BDE, 4) containing the imprints of one or more potential users of the terminal.

It will be noted that this learning module and this base are not necessarily situated on the terminal: they can be on a server in the cloud, on the master device if centralized operation is desired, etc.

Figure 3:
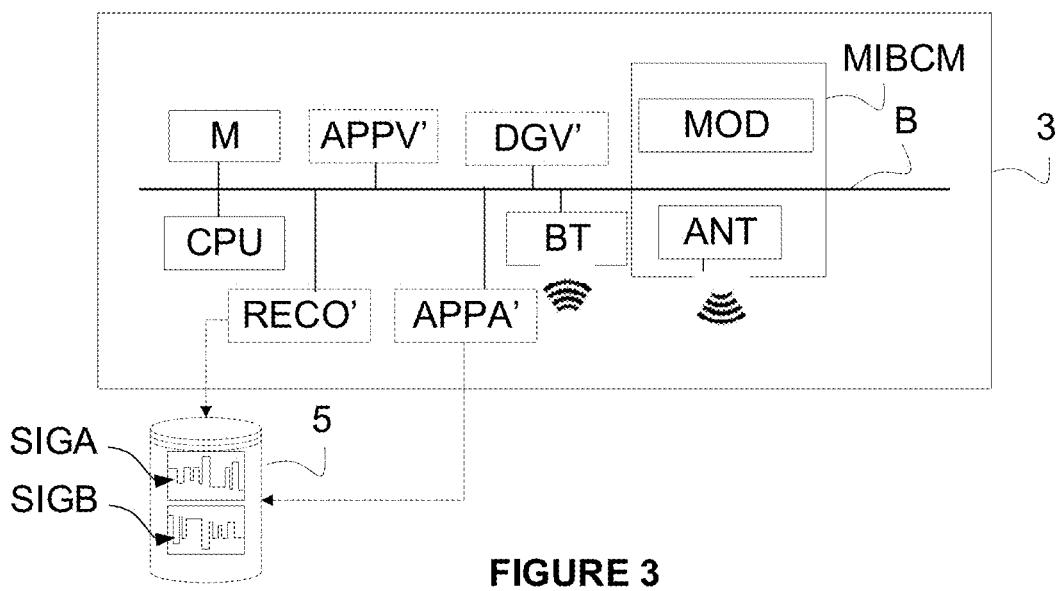
FIG. 3 represents a master device according to one embodiment of the invention.

A master device (3) according to the invention will now be described in conjunction with FIG. 3.

Figure 2:
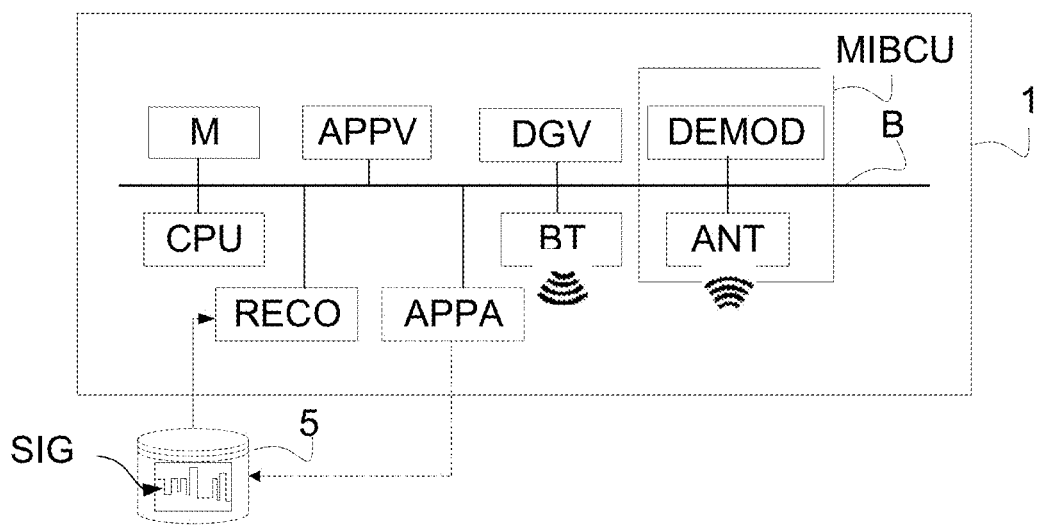
FIG. 2 represents a terminal according to one embodiment of the invention.

The master device comprises several modules which are similar to those of the terminal 1 which is described in conjunction with FIG. 2:
  a processing unit or "CPU", intended to load instructions into memory, to execute them, to perform operations.

a set of memories, which includes a volatile memory or "RAM" (for "Random Access Memory") used to execute code instructions, store variables, etc., and a nonvolatile memory, of "ROM" or "EEPROM" type intended to contain persistent information;

a module termed "master IBC Module", MIBCM, including:
- a CBB antenna (ANT) adapted to emit signals on the radio pathway and via the human body;
- a modulator (MOD) intended to adapt a digital signal produced by the microprocessor into a modulated electrical signal, intended to be transmitted, via the antenna, through the body of the user. The modulation operation performed by the modulator is for example an amplitude modulation: the signal is a 13.56 MHz signal amplitude-modulated with a modulation rate of about 10% (known characteristic of type B according to the NFC standard). The invention is however not limited to this type of modulation. In another exemplary embodiment, the modulation is a frequency modulation, less sensitive to glitches, or, a phase modulation;
- a contact surface, not represented, adapted to react in the immediate proximity of the user (contact, quasi-contact, swiping, etc.). In the example described here, this surface corresponds to the antenna, in such a way that a modulated electrical signal emitted via the antenna is able to be conveyed by the body of the user who is in proximity with the surface. In an exemplary embodiment, the antenna can be integrated into the surface. The surface is arranged in such a way as to cooperate with the processing unit so as to implement the steps of the method which will be described subsequently;
- a radio module of Bluetooth or Wi-Fi type intended in particular to receive data in return from the mobile item (signals received by the mobile item, characteristic imprint, data relating to the transaction, etc.) and/or to re-enter into contact with another device so as to validate the transaction (door, connected object, etc.).

the software components (firmware, etc.) necessary for the implementation of the IBC communications.

optionally a user interface (MMI), adapted to transmit instructions or information messages to the user. For example, the user interface is a screen on which the messages and instructions are displayed. In another exemplary embodiment, the interface is an audio interface making it possible to play the messages and instructions, for example to signify to the user that they can remove their hand from the surface. The MMI can also comprise a keyboard, a microphone, etc.

optionally, and in particular if these modules are not present on the terminals:

an application (APPA') intended for the implementation of a method of learning according to one embodiment of the invention, in conjunction with a database of characteristic imprints (BDE, 5); a base comprising the characteristic imprints (signatures, SIG) of two users A and B denoted SIGA and SIGB has been shown diagrammatically in the figure.

a voluntary gesture detection module, DGV' for analyzing the signals received by the CBB module and deciding whether or not the movement comprises a voluntary gesture (GV) and a recognition module RECO' for analyzing the signal received subsequent to a voluntary movement of the user and for comparing it with the signals of the base of characteristic imprints.

an application (APPV') intended for the implementation of the method of identification or authentication according to embodiments of the invention.

It is recalled that any commercial reader (for example an EPT) can advantageously be used in the guise of master device, on condition that the module MIBCM is exploited, after a simple update of the software of the reader (installation and/or updating of the application and parametrization of the NFC emission) to enable it to emit a message possessing the CBB characteristics (frequency, modulation, etc.) via its antenna.

Figure 4:
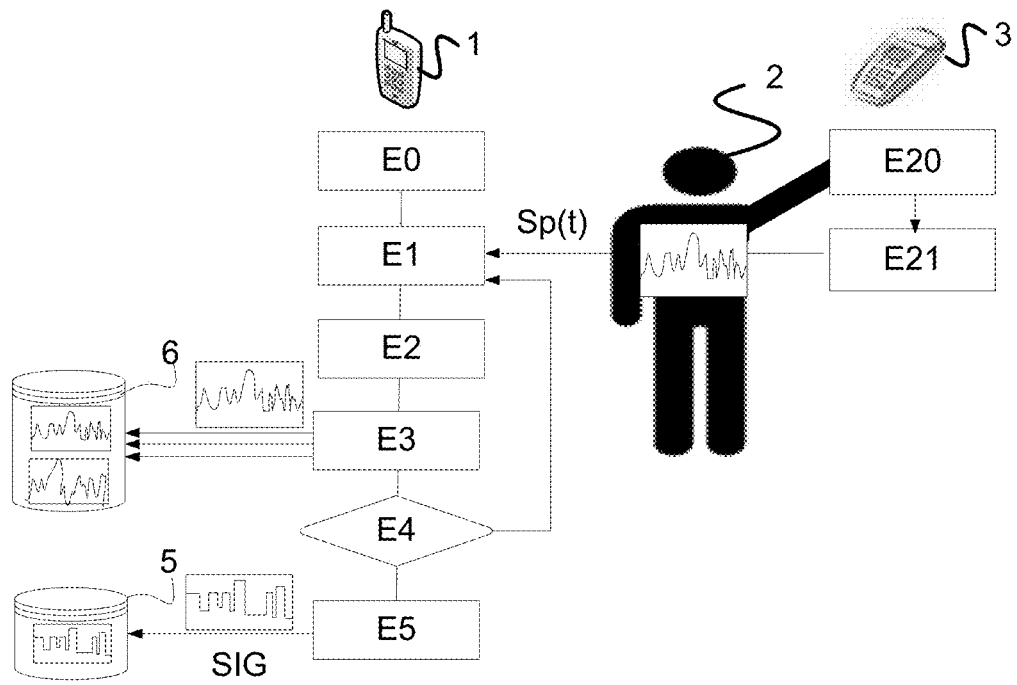
FIG. 4 represents the steps of a characteristic imprint learning method according to one embodiment of the invention.

FIG. 4 represents the steps of a method of learning according to one embodiment of the invention.

The learning is carried out by repetition of a voluntary movement (MV) corresponding to a series of voluntary gestures (GV) at the level of a learning master device. The user is for example in an outlet of a telecommunications operator and is getting ready to record their characteristic imprint which will be their reference signature, that they will be able to use thereafter during the CBB services thereof.

According to this embodiment, the communication is unidirectional, from the master device to the terminal, and a Bluetooth communication channel (4) is used for the communication from the mobile item to the learning master device. The mobile terminal, of CBB smartphone type, is in the user's pocket.

It is assumed here that all the prerequisites necessary for the CBB communication have been performed in the course of the respective initialization steps E0 and E20, such as for example is described in application WO2017/093639, in particular the broadcasting by the master device of an invite message optionally comprising parameters relating to the service offered (service identifier, random, which will make it possible in particular to perform the Bluetooth pairing, etc.), the positioning of the terminal in CBB reception mode, the launching of the learning program, etc.

During a step E1, the user performs their voluntary movement (MV) toward the master device (console, EPT, etc.). As will be detailed later in support of FIGS. 7 and 8, the voluntary movement corresponds to a voluntary gesture or to a succession of several voluntary gestures (GV) performed by the user. The voluntary movement is for example a series of taps performed with a given frequency and a given duration and known to the user alone, the voluntary movement corresponds to this series of taps and each of the taps is a voluntary gesture.

During a step E21, the communication is established on the IBC channel. The console emits and the terminal receives the signal SP(t) transmitted via the body of the user carrying the characteristics of the movement (MV).

During a step E2, the mobile terminal receives, demodulates and processes the received signal; next it attempts to validate a voluntary gesture of the user, that is to say it decides whether or not the user's gesture corresponds to a voluntary gesture. Such a method is described for example in the applicant's aforementioned patent application WO2016/001506 summarized in support of FIG. 8. A single voluntary gesture suffices for validation (even if the movement comprises a succession of voluntary gestures).

Next during a step E3, the terminal stores the signal in a memory (represented here in the form of a database (6) by way of example). Alternatively it can also transmit the signal, denoted Sp(t), to an external learning server.

Step E4 corresponds to the test of the number of iterations N; as long as the desired number of iterations is not attained, the mobile item asks the user to redo the voluntary movement (step E1) and receives a new signal Sp(t) (step E1) that it stores with the other signals Sp(t) (step E3). For example, the counter N is fixed at 3 and three valid signals $S_1(t)$, $S_2(t)$, $S_3(t)$ must be received and recorded. When the desired number of iterations is attained, step E4 will be followed by a step E5 of calculating the characteristic imprint. It will be noted that the number N of iterations can be predefined (for example N=10) or defined by the algorithm itself: for example if the curves Sp(t) are too different from one another, according to a statistical criterion (standard deviation, variance, etc.), the number N can be increased; if the curves Sp(t) are very close, it can be decreased.

According to an example, the following algorithm can be used:
- acquisition of two signals $S_1(t)$, $S_2(t)$, subsequent to two valid movements of the user
- calculation of a distance between the two signals, optionally corrected and shifted in time. An exemplary calculation such as this is conventional for the person skilled in the art of signal processing: for example, a Euclidean distance can be calculated between first two signals previously aligned in time, and then a second distance calculated between the third signal and the average of the first two, etc. In order to compare two signals with one another, be they analog or digital, it is also known to determine a correlation function between these two signals and to verify on the basis of the values of this function whether or not there is identity between the signals. Schemes for numerical calculation of the correlation function are conventionally used for this.
- If the distance is below a certain threshold, calculation of the signature, else acquisition of a third signal $S_3(t)$ and calculation of a distance between the three curves, or of a distance between each of the curves and a statistical average of the three curves, etc.
- etc.

According to another example, a neural network can be used, as described in the article "Authentification et Identification de Visages basées sur les Ondelettes et les Réseaux de Neurones" [Authentication and Identification of Faces based on Wavelets and Neural Networks] by M.BELAHCENE-BENATIA Mébarka (Revue science des matériaux, Laboratoire LARHYSS N°02, September 2014 pp. 01-08). The scheme described, based on the transformation of a two-dimensional image of a face into a vector of size N obtained by stringing together the rows (or columns) of the corresponding image, followed by the establishment of a covariance matrix between the various images, can be easily adapted to the samples of the digital signals arising from the signals Sp(t).

During step E5, the learning program calculates the characteristic imprint on the basis of all (N) the signals Sp(t) received. Any scheme within the scope of the person skilled in the art for obtaining a signal representative of the N signals Sp(t) can be used, for example:
- it calculates an average, or
- it uses a (convolutional) neural network to learn to recognize the user, or
- it uses an SVM (Support Vector Machine) system to class the various signals received by placing them in the subset corresponding to the user's signals, etc.

Figure 7:
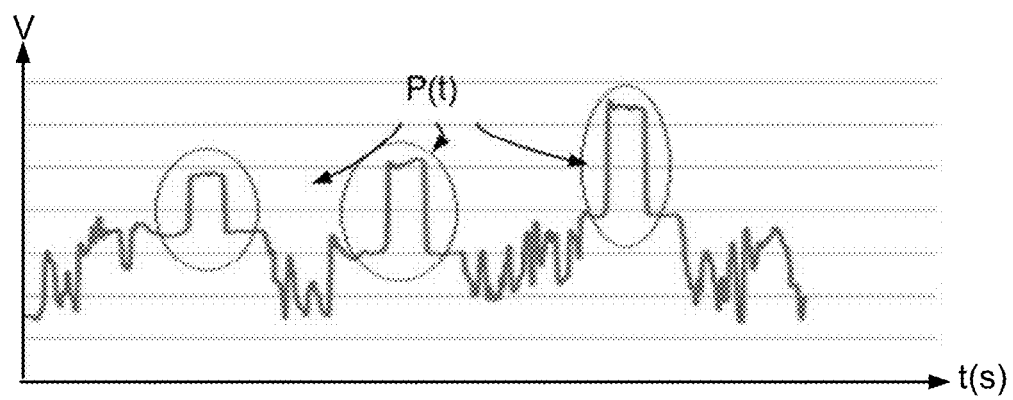
FIG. 7 represents an exemplary signal corresponding to a voluntary movement of a user.

The characteristic imprint can typically take the form of an analog or digital signal, that is to say a function representing the variations of the signal corresponding to the mean movement of the user over a time interval, for example a few seconds. Such a signal is represented by way of example in FIG. 8. A corresponding exemplary signal Sp(t) is shown in FIG. 7. Alternatively, the characteristic imprint could take the form of any set of data characteristic of the signal generated by the movement of the user, depending at one and the same time, as explained above, on the voluntary gesture itself, on the biological characteristics of the user, and on the characteristics of the terminal:
- digital data set;
- index in an existing dictionary of signatures corresponding for example to basic movements of a user of the system (tap, scan, etc.)
- transfer function of a channel corresponding to the body of the user; it will be noted in this regard that the electromagnetic wave propagates on the surface of the human body when the user (2) establishes contact. No faithful complete modeling of this transfer in the human body at the working frequency exists to date. However, experiments have been carried out to get experimental models, as reported in the article "Experimental Studies on Human Body Channel Communication Characteristics Based upon Capacitive Coupling." (Wang et al. Proceedings of 2011 International Conference on Body Sensor Networks (BSN), Dallas, Tex., USA, 23-25 May 2011; pp. 180-185). Simplified modellings of a part of the body (arm, torso, abdomen and legs) are also known and could in the near future allow a complete modeling of the human body to be obtained. Reference may be made for example to the article "Electric-field intrabody communication channel modeling with finite element method" (Xu et al., IEEE Trans. Biomed. Eng., vol. 58, No. 3, pp. 705-712, March 2011)
- etc.

The characteristic imprint thus calculated, or reference signature, is stored in a memory, or database (5), either in the mobile item, or in a database of imprints, preferably with an identifier of the user (for example their name, their date of birth, their telephone number, the MAC address of their terminal, their bank account number, etc.).

According to another embodiment, not represented, it is the master device (console) which calculates the characteristic imprint. In this case, step E1 of recovering the signal or E2 of recognizing a voluntary gesture by the mobile item can be followed by a step of retransmitting this signal to the master device, via the Bluetooth channel.

Figure 5:
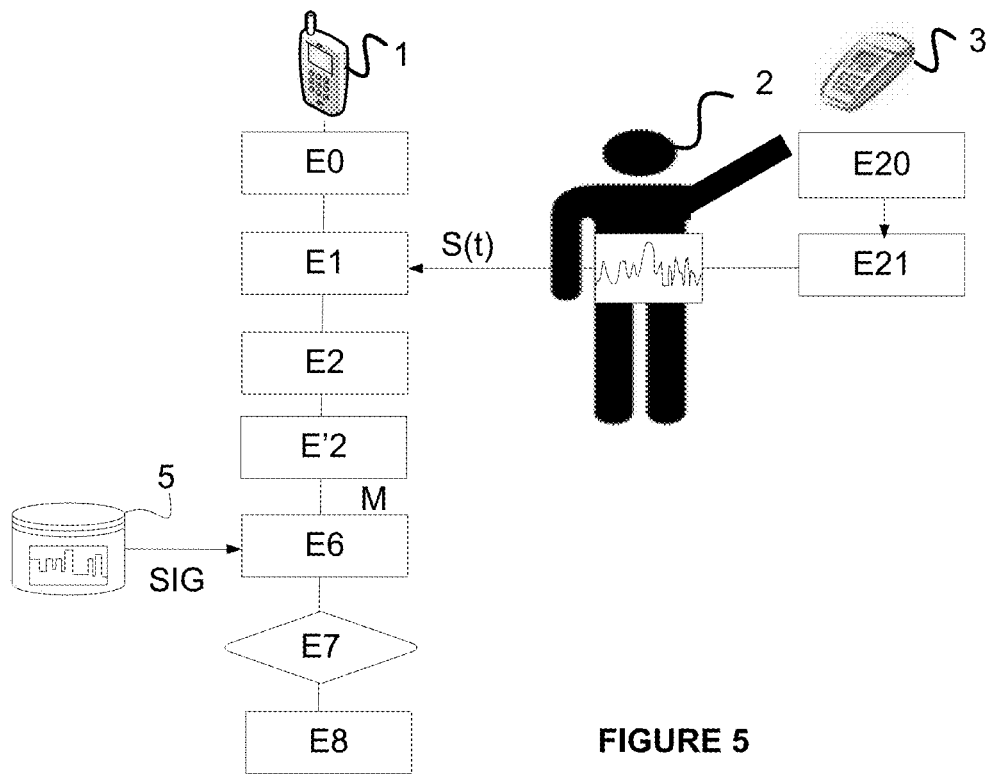
FIG. 5 represents the steps of an authentication method according to one embodiment of the invention.

FIG. 5 represents the steps of a method for authenticating a user according to a first embodiment of the invention.

In this embodiment, the user performs a voluntary movement in the direction of a master device (EPT) to validate a transaction, for example monetary. If the procedure succeeds, the user is authenticated, that is to say the latter is recognized as being the owner of the terminal.

It is assumed here, just as previously, that all the prerequisites necessary for the CBB communication have been performed in the course of the respective steps E0 and E20. It is also assumed that the learning phase described previously in support of FIG. 5 has been performed and that the user's characteristic imprint is on the mobile terminal (it is recalled that it could be located elsewhere, in a database external to the terminal). It is recalled that the voluntary movement (MV) is secret and corresponds to the user's signature (SIG) recorded in the base in analog, digital, or other form. The signal (denoted S(t)) is transported via the body of the user to the terminal.

Steps E1 (voluntary movement of the user), E21 (establishment of the communication on the IBC channel and transmission of a signal S(t) carrying the characteristics of the voluntary movement) and E2 (processing of the received signal and detection of a voluntary gesture), are similar to the corresponding steps described previously in support of FIG. 4.

During a step E'2, the method establishes a characteristic curve of the movement (M) on the basis of the received signal, optionally processed during the previous step.

Next during a test step E6, the terminal accesses the memory (or database) to read the user's signature. If the accessed memory is not on the terminal but for example in the cloud (or on the master device), a Bluetooth return channel will be able to be used advantageously to access it.

In a following comparison step E7, the received and processed signal (M) is compared with the user's signature (SIG). This makes it possible to be sure that it is indeed the user carrying the mobile terminal who has placed their hand on the console, stated otherwise this step performs an authentication of the carrier. Several types of comparison can be performed:

calculation of "distance" between the characteristic curve of the movement (M) and the imprint (SIG) stored in the base. If the distance between the two signals is less than a threshold, the user is authenticated the service can be launched. It is possible to make for example a point-to-point correlation between the 2 signals (the candidate signal received and the signal corresponding to the characteristic imprint) by calculating a difference of each value of the 2 curves, by optionally displacing the signal received over the reference signal. The minimum value obtained should be close to zero if the 2 curves are very similar.

the use of neural networks (normal or convolutional), where a multi-layer neural system learns by adjusting its internal weights to recognize a person on the basis of the signal obtained. Such an approach is described for example in the aforementioned article by Mébarka. etc.

On completion of this comparison step, if the received signal corresponds to the signature, the user is authenticated and step E7 can be followed by a step E8 of implementing the transaction, for example the validation of a payment. In the converse case, that is to say if the voluntary movement does not correspond to the signature, it is for example possible to return to step E1 and ask the user to redo the voluntary movement. According to a variant, a number of predefined trials (for example 3) can be authorized before cancellation of the transaction.

Figure 6:
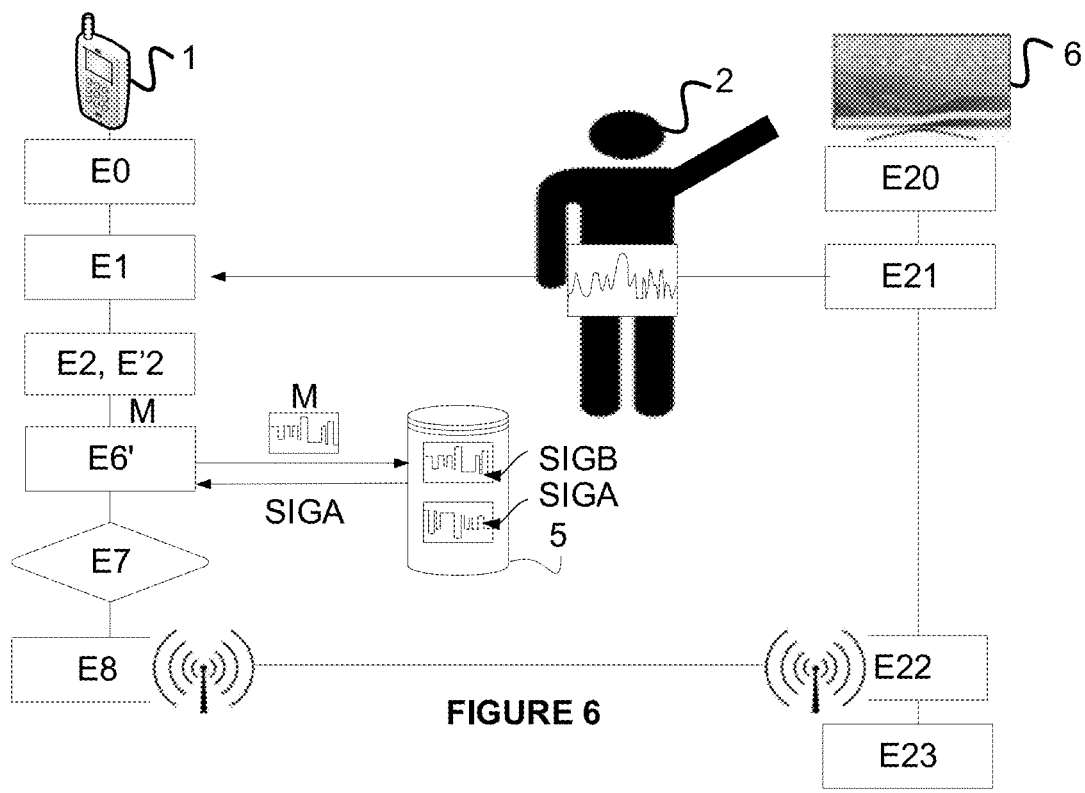
FIG. 6 represents the steps of an identification method according to a second embodiment of the invention.

FIG. 6 represents the steps of an identification method according to a second embodiment of the invention.

In this embodiment, the user performs a voluntary movement in the direction of a master device so as to be identified and to launch a personalized service, for example the reading of a preferred television channel. If the procedure succeeds, the user is identified, that is to say the latter is recognized as being a given user (A or B) and the corresponding service can access their profile and take appropriate action (launch channel A for A or channel B for B). For example a connected television is equipped with the master device (a CBB console) and the terminal (or the television) can access a database (or memory) comprising all the signatures of the users of the house (A, B, C, D, etc.).

It is assumed here, just as previously, that all the prerequisites necessary for the CBB communication have been performed in the course of the respective steps E0 and E20.

It is also assumed that the learning phase described previously in support of FIG. 5 has been performed by each of the users and that each user's characteristic imprint is on their mobile terminal or is at least accessible from their mobile terminal. Alternatively, several signatures corresponding to the users of a multi-user terminal can be stored on the terminal (for example a tablet), or in an external database.

When user A performs their voluntary movement (corresponding to their signature), the electromagnetic signal (denoted S(t)) is transported via their body to the terminal which is in their pocket.

Steps E1 (voluntary movement of the user), E21 (establishment of the communication on the CBB channel and transmission of a signal S(t) carrying the characteristics of the voluntary movement), E2 (validation of a voluntary gesture) and E'2 (establishment of the characteristic curve M of the movement) are similar to the corresponding steps described previously in support of FIGS. 4 and 5.

Step E6' differs from step E6 previously described in that the characteristic signal M arising from step E'2 must be compared with the characteristic imprints stored in the database.

if the message M is not accompanied by an identifier, the method will have to analyze in the course of this step all the signatures of the base before finding the one that corresponds to the user; if it finds one for which the difference with the signal M is small (i.e. less than a given threshold), then this imprint is declared to be that of the user.

As earlier, several types of comparison/calculations of distances can be performed, and in particular those described in the aforementioned article by Mébarka, on replacing the faces (in the article) by the reference signatures corresponding to the voluntary movements of the various users. In this case, on completion of step E7, the method will be able to provide for example the signature (SIGA) closest to the message M.

if on the contrary the message M is accompanied by an identifier, it will suffice to access directly in the base the signature corresponding to this identifier. Step E7 is similar to that of FIG. 5: the "best signature" can be compared with the message M, and a distance/similarity calculated between the two.

If a voluntary movement corresponding to the selected signature has been validated during step E7, the recognition device has therefore identified a user of the terminal, a Bluetooth channel can be opened between the two devices in the course of steps E8 and E22, so as to retransmit via this channel to the connected television (or to the master device) an identifier of the user (name, forename, age, number, etc.) or else the favorite channel number of the user after reading the corresponding profile. Else, it does not open the communication channel, and the method can resume optionally at step E1/E21.

During a step E23 the television can render the requested service, that is to say according to this example, can select the profile of the identified user (for example A) and launch the channel A corresponding to the profile, or launch the channel directly if the terminal has transmitted the reference thereof thereto.

FIG. 7 represents an exemplary signal (S(t)) corresponding to a voluntary movement of a user.

By voluntary movement (MV) is meant here a set of voluntary gestures (GV) carried out by the user with the aim of constructing a characteristic imprint, and thereafter of validating an electronic transaction by virtue of this imprint.

FIG. 7 shows a demodulated signal recorded by the antenna during a test carried out over a minute.

If one wishes to perform a voluntary gesture, one positions oneself in front of the IBC master device. A constant low porch is observed with oscillations in case of absence of movement in front of the reader. If a voluntary gesture is performed, a high porch is then observed which remains constant as long as the hand is placed on the reader. The voluntary gesture detection algorithm should therefore detect a string of the type "low porch, high porch, low porch". Voluntary gesture detection such as this has been described in the applicant's application WO2016/001506. To summarize, the algorithm adopts the following steps:

sampling by the microcontroller;
smoothing of the signal;
differentiation of the smoothed signal;
detection, by virtue of the differentiated signal, of the presence of two separate peaks, the first corresponding to the rising edge and the second to the falling edge of the signal on either side of the high porch.
verification of the duration between the two peaks, corresponding to the width of the high porch and therefore to the time for which the user has left their hand on the reader (for example, between 1.5 s and 3 s).
if all the conditions are fulfilled for deciding that one is dealing with a high porch, it is decided that a voluntary gesture is present.

The signal represented in FIG. 7 thus corresponds to three successive voluntary gestures performed by the user. Therefore, according to this example, the user's voluntary movement consists of three successive voluntary gestures of a characteristic separation and of a characteristic duration (which may correspond to 3 taps of different duration and different amplitude) which are interpretable on the curve of the signal S(t).

Figure 8:
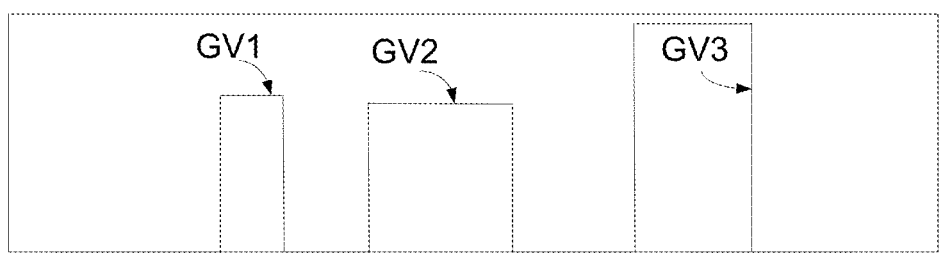
FIG. 8 represents an exemplary characteristic imprint or signature corresponding to a voluntary movement of a user.

FIG. 8 represents a characteristic imprint corresponding to a movement of a user.

It is assumed that the method according to the invention has recovered and stored N signals comparable to that of FIG. 7. On the basis of these N signals, a characteristic imprint, or signature, can be calculated, which can take for example the shape of the signal represented in FIG. 8: the user's characteristic movement consists of three voluntary gestures (GV1, GV2, GV3) represented by the three successive porches (or slots) corresponding to the slots P(t) of the signal of FIG. 7. It may for example be a tap performed on the surface of the antenna.

It goes without saying that the embodiment which has been described hereinabove has been given purely by way of wholly nonlimiting indication, and that numerous modifications can easily be introduced by the person skilled in the art without however departing from the scope of the invention.

The invention claimed is:

1. A recognition method for recognizing a user carrying a terminal, said terminal being able to receive a near field radio signal originating from a master device furnished with an antenna able to emit the signal, said signal being intended to be transmitted between the master device and the terminal on a first channel by using electromagnetic wave conduction capacities of the body of the user when at least a part of the body of the user is situated in proximity to the antenna, wherein:

when the user performs a characteristic movement so as to approach the antenna of the master device with said part of their body, while said master device emits a near-field radio signal, said emitted signal is transmitted in the body of the user with a shape that is characteristic of said movement;

and wherein the method comprises acts performed by the terminal, comprising:

receiving, on the first channel conducted through the body of the user, the near-field radio signal originating from the master device and which is characteristic of the movement;

generating a first datum characteristic of the characteristic movement by analysis of the shape of the received signal;

obtaining at least one second characteristic datum, so-called a reference signature;

comparing the first characteristic datum with said at least one reference signature;

as a function of the results of the comparison, recognizing the user.

2. The recognition method as claimed in claim 1, wherein said at least one reference signature is associated with a profile of the user and the recognizing act is followed by a selection act of selecting the profile of the recognized user.

3. The recognition method as claimed in claim 1, wherein the recognizing act is followed by an establishment act establishing a radio communication on a second channel not using electromagnetic wave conduction capacities of the body of the user.

4. The recognition method as claimed in claim 1, wherein the act of establishing a first datum characteristic of the movement comprises a sub-act of detecting a slot at least corresponding to a voluntary gesture of the user.

5. The recognition method as claimed in claim 1, wherein the act of generating a first datum characteristic of the movement comprises the following sub-acts:

digitizing the signal received;

detecting in the digital signal of at least one rising edge and one falling edge corresponding to at least one slot;

generating the first characteristic datum in the form of a digital signal comprising at least said slot.

6. The recognition method as claimed in claim 1, wherein the comparing act comprises the following sub-acts, after compensation of a possible shift between the first characteristic datum and the reference signature:

measuring a distance between the first characteristic datum and the reference signature;

validating the comparison as a function of the measured distance.

7. A method of learning a reference signature of a user carrying a terminal, said terminal being able to receive near filed field radio signals originating from a master device furnished with an antenna able to emit the signal, said signal being intended to be transmitted between the master device and the terminal by using electromagnetic wave conduction capacities of the body of the user when at least a part of the body of the user is situated in proximity to the antenna, the method comprising:

when the user performs a characteristic movement so as to approach the antenna of the device with said part of their body, while said master device emits near-field radio signals, said emitted signals are transmitted in the body of the user with a shape that is characteristic of said movement;

and the method comprises acts performed by the terminal, comprising:

receiving a plurality of the near-field radio signals conducted through the body of the user and originating from the master device, the received near-field radio signals being characteristic of the movement;

generating a characteristic datum, called a signature, by analysis of the shape of the plurality of the received signals; and recording said signature as the reference signature of the user.

8. The method of learning as claimed in claim 7, furthermore comprising obtaining a necessary number of signals of said plurality of the near-field radio signals.

9. The method of learning as claimed in claim 8, wherein the act of obtaining the necessary number of signals comprises the following sub-acts:

obtaining the plurality of near-field radio signals;

calculating a distance between said signals of the plurality of near-field radio signals;

as a function of the calculated distance, obtaining a new near-field radio signal to be added to the plurality of near-field radio signals.

10. A terminal carried by a user, said terminal being configured to receive a near-field radio signal originating from a master device furnished with an antenna able to emit the signal, said signal being intended to be transmitted between the master device and the terminal by using electromagnetic wave conduction capacities of the body of the user when at least a part of the body of the user is situated in proximity to the antenna, wherein said terminal comprises:

at least one processor; and at least one non-transitory computer-readable medium comprising instructions stored thereon, which when executed by the at least one processor configure the terminal to perform acts comprising:

receiving the near-field radio signal originating from the master device and conducted through the body of the user, the received near-field radio signal having a shape that is characteristic of a characteristic movement performed by the user;

generating a first characteristic datum of the characteristic movement by analysis of the shape of the received signal;

obtaining a comparison result of comparing the first characteristic datum with at least one reference signature; and recognizing the user, as a function of the result of the comparison.

11. A learning device for learning a reference signature of a user carrying a terminal, said terminal being able to receive near-field radio signals originating from a master device furnished with an antenna able to emit the signal, said signal being intended to be transmitted between the master device and the terminal by using electromagnetic wave conduction capacities of the body of the user when at least a part of the body of the user is situated in proximity to the antenna, wherein:

when the user performs a characteristic movement so as to approach the antenna of the device with said part of their body, while said master device emits near-field radio signals, said emitted signals are transmitted in the body of the user with a shape that is characteristic of said movement;

and wherein the learning device comprises:

at least one processor; and at least one non-transitory computer-readable medium comprising instructions stored thereon, which when executed by the at least one processor configure the learning device to perform acts comprising:

receiving a plurality of the near-field radio signals conducted through the body of the user and originating from the master device, the received near-field radio signals being characteristic of the movement;

generating a characteristic datum, called a signature, by analysis of the shape of the plurality of received signals; and recording said signature as the reference signature of the user.

12. The terminal, which comprises the device for learning a signature as claimed in claim 11.

\* \* \* \* \*